United States Patent
Walker et al.

(10) Patent No.: US 7,702,333 B2
(45) Date of Patent: Apr. 20, 2010

(54) WIRELESS LOCAL AREA NETWORK AND METHODS FOR SECURE RESOURCE RESERVATIONS FOR FAST ROAMING

(75) Inventors: Jesse R. Walker, Portland, OR (US); Kapil Sood, Beaverton, OR (US); Meiyuan Zhao, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 836 days.

(21) Appl. No.: 11/382,814

(22) Filed: May 11, 2006

(65) Prior Publication Data

US 2007/0266244 A1 Nov. 15, 2007

(51) Int. Cl.
*H04W 4/00* (2009.01)

(52) U.S. Cl. ........................ 455/434; 455/410; 455/411; 455/435.1; 455/435.2

(58) Field of Classification Search ................. 455/434, 455/410, 411, 435.1, 435.2
See application file for complete search history.

(56) References Cited

U.S. PATENT DOCUMENTS

| | | | |
|---|---|---|---|
| 6,094,575 A * | 7/2000 | Anderson et al. ........ 455/422.1 |
| 7,032,241 B1 | 4/2006 | Venkatachary et al. |
| 7,224,800 B1 * | 5/2007 | Flykt et al. ................... 380/247 |
| 7,424,284 B2 * | 9/2008 | Torvinen et al. ............ 455/411 |
| 2003/0226017 A1 * | 12/2003 | Palekar et al. ............... 713/168 |
| 2004/0039919 A1 * | 2/2004 | Takayama et al. ........... 713/180 |
| 2004/0068653 A1 | 4/2004 | Fascenda |
| 2005/0177733 A1 * | 8/2005 | Stadelmann et al. ........ 713/185 |
| 2006/0004643 A1 * | 1/2006 | Stadelmann et al. .......... 705/34 |
| 2006/0155995 A1 * | 7/2006 | Torvinen et al. ............ 713/169 |
| 2008/0109331 A1 * | 5/2008 | Stadelmann et al. .......... 705/34 |

OTHER PUBLICATIONS

"PCT Application No. PCT/US2007/068576, International Search Report mailed Oct. 25, 2007", 3 pgs.
"PCT Application No. PCT/US2007/068576, Written Opinion mailed Oct. 25, 2007", 5 pgs.

* cited by examiner

*Primary Examiner*—Joseph H Feild
*Assistant Examiner*—Huy D Nguyen
(74) *Attorney, Agent, or Firm*—Schwegman, Lundberg & Woessner, P.A.; Gregory J. Gorrie (57) ABSTRACT

Embodiments of an authorization server and method for securely reserving resources in a wireless network are generally described herein. Other embodiments may be described and claimed. In some embodiments, access points reserve bandwidth thereon through the verification of reservation tokens received from the mobile station.

23 Claims, 3 Drawing Sheets

WIRELESS NETWORK

*FIG. 1*

HASH CHAIN

WIRELESS LOCAL AREA NETWORK AND METHODS FOR SECURE RESOURCE RESERVATIONS FOR FAST ROAMING

TECHNICAL FIELD

Some embodiments of the present invention pertain to wireless networks. Some embodiments of the present invention pertain to reserving bandwidth for roaming among access points in a wireless network. Some embodiments of the present invention relate to the communication of voice and/or video traffic over internet-protocol (IP) based wireless networks, such as wireless local area networks (WLANs).

BACKGROUND

In many wireless networks, a mobile station associates with an access point for network communications. As the mobile station changes its location, the mobile station may transition (i.e., roam) between different access points to maintain continuous communications with the network. One issue with transitioning between access points is that transitions need to be completed quickly to meet the quality of service (QoS) level requirements of certain traffic flows. For example, when a mobile station is communicating voice traffic, such as voice over internet protocol (VoIP) traffic, transitions between access points should be completed within approximately 50 milliseconds to prevent the user from hearing clicks or experiencing a noticeable delay. Similar requirements apply to video traffic. In some networks, transitions should be completed within approximately 200 milliseconds to prevent a loss of network communications (e.g., dropped call).

Thus, there are general needs for communication devices and methods that facilitate fast roaming in wireless networks. There are also general needs for communication devices and methods that meet QoS requirements for fast roaming in wireless networks when communicating real-time traffic, such as voice or video traffic.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
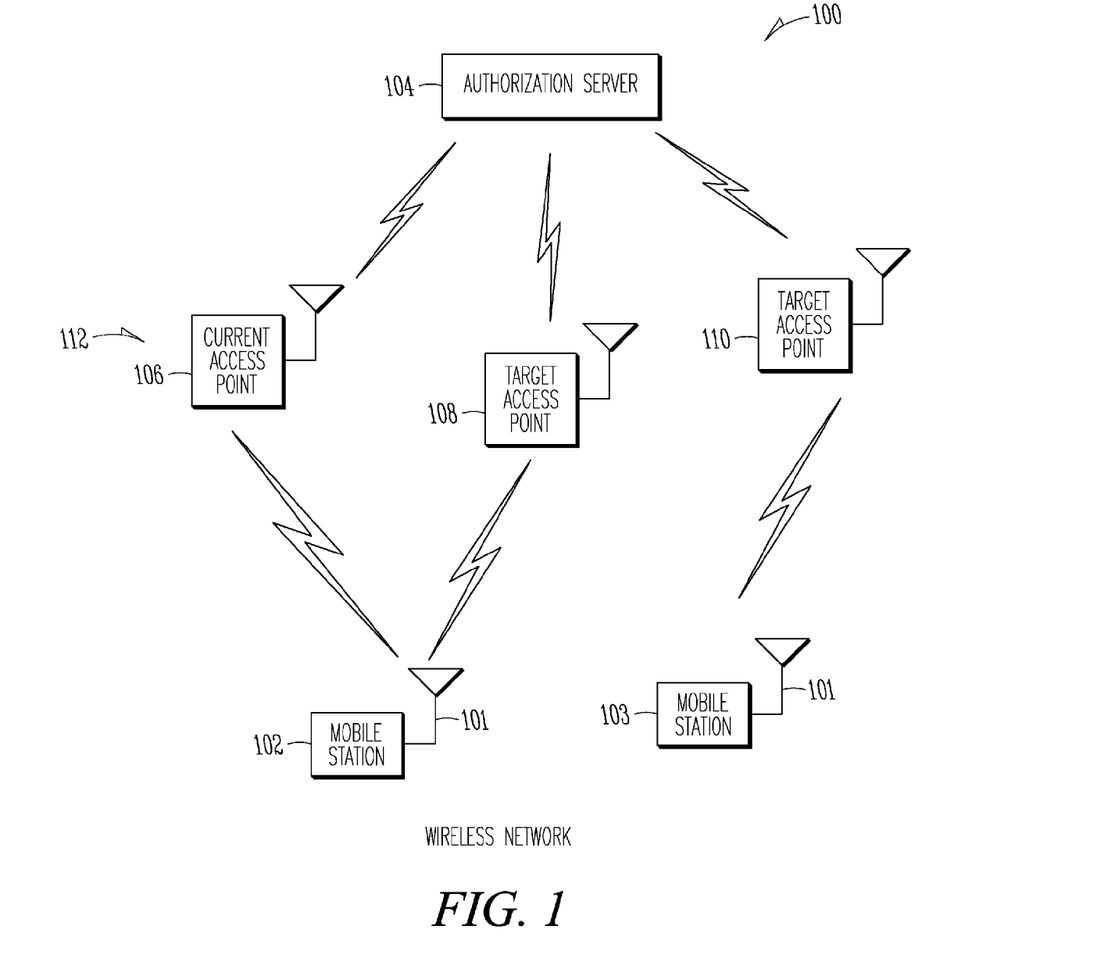
FIG. 1 is a diagram of a wireless network in accordance with some embodiments of the present invention.

FIG. 1 is a diagram of a wireless network in accordance with some embodiments of the present invention. Wireless network 100 may comprise a plurality of access points 112, authorization server 104, and one or more mobile stations, generally illustrated as mobile stations 102 and 103. Access points 112 provide for packet-based wireless communications with mobile stations 102 and 103 allowing mobile stations 102 and 103 to communicate within wireless network 100 as well as allowing mobile stations 102 and 103 to communicate with external networks such as the internet. In some embodiments, wireless network 100 may be a wireless local area network (WLAN), although the scope of the invention is not limited in this respect. In some embodiments, mobile stations 102 and 103 may include one or more antennas 101 for communicating with other network devices, such as access points 112 and/or authorization server 104.

In accordance with some embodiments of the present invention, mobile stations 102 and 103 may transition between access points 112 to maintain communications as mobile stations 102 and 103 change their location. As illustrated in FIG. 1, mobile station 102 may be securely associated with a currently associated access point, such as current access point 106, although the scope of the invention is not limited in this respect. Mobile station 102 may wish to transition to another access point, such as target access point 108 or target access point 110. In these embodiments, authorization server 104 may authorize mobile station 102 to securely reserve bandwidth on one or more of access points 112 for fast roaming in wireless network 100. In these embodiments, authorization server 104 may verify reservation tokens received from mobile station 102 through one of access points 112 in resource reservation requests. The reservation tokens may be members of a hash chain making forgery difficult while allowing verification. In these embodiments, authorization server 104 may provide a challenge value for use by mobile station 102 in generating the hash chain from the challenge value. In these embodiments, when mobile station 102 wishes to reserve resources on target access points 108 and 110, authorization server 104 may verify reservation tokens received in reservation request messages by computing and verifying a hash on a received reservation token concatenated with the challenge value. These embodiments of the present invention may allow mobile station 102 to reserve bandwidth on a target access point, such as target access point 108, before mobile station 102 securely associates with target access point 108.

In this way, the number of access points 112 that mobile station 102 may reserve bandwidth on may be securely limited to the number of reservation tokens in the hash chain. In these embodiments, the predetermined number of reservation tokens that mobile station 102 may generate may correspond to a reservation limit discussed in more detail below. In some embodiments, the resource reservations may include reservations for bandwidth and may include QoS requirements for a particular traffic flow, such as a voice or a video traffic flow, although the scope of the invention is not limited in this respect. These embodiments are discussed in more detail below.

Figure 2:
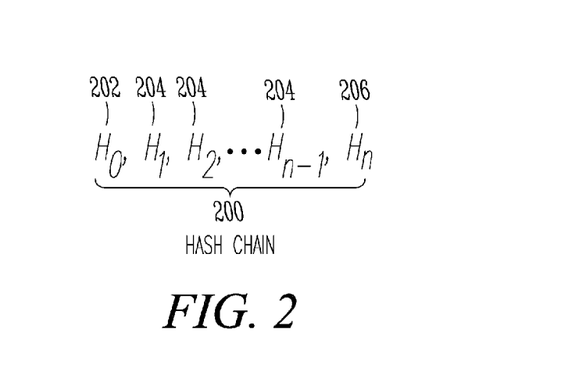
FIG. 2 illustrates a hash chain in accordance with some embodiments of the present invention.

FIG. 2 illustrates a hash chain in accordance with some embodiments of the present invention. Hash chain 200 comprises commitment value ($H_0$) 202, and a plurality of reservation tokens ($H_1$ through $H_{n-1}$) 204 including hash chain root ($H_n$) 206. Hash chain root 206 may be considered an initial reservation token which is used to generate subsequent reservation tokens. The generation of hash chain 200, the use of commitment value 202 and the use of reservation tokens 204 including hash chain root 206, are discussed in more detail below.

Figure 3:
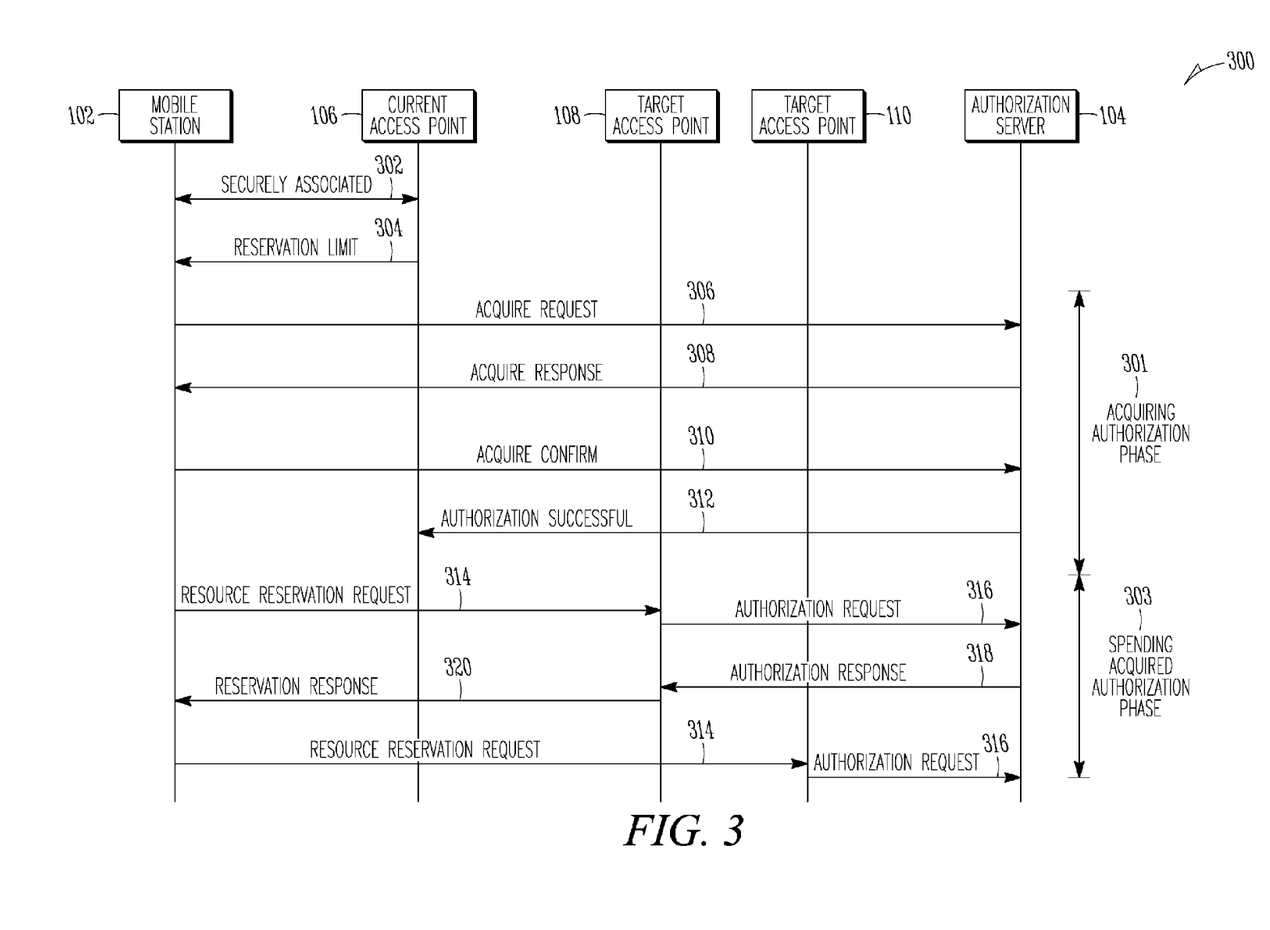
FIG. 3 illustrates a fast roaming procedure in accordance with some embodiments of the present invention.

FIG. 3 illustrates a fast roaming procedure in accordance with some embodiments of the present invention. Fast roaming procedure 300 includes two phases: acquiring authorization phase 301 and spending acquired authorization phase 303. During acquiring authorization phase 301, mobile station 102 may acquire reservation tokens 204 (FIG. 2). During spending acquired authorization phase 303, mobile station 102 may use (i.e., spend) one or more of reservation tokens 204 (FIG. 2) to reserve bandwidth on one or more target access points, such as target access point 108 and/or target access point 110. After spending acquired authorization phase 303, mobile station 102 may choose to transition to one of target access points 108 or 110, although the scope of the invention is not limited in this respect.

The following description refers to FIGS. 1, 2, and 3 together. Prior to acquiring authorization phase 301, mobile station 102 may be securely associated with current access point 106, illustrated by communications 302. After mobile station 102 is securely associated with current access point 106, current access point 106 may provide a reservation limit in message 304 to mobile station 102. The reservation limit may correspond to the number of resource reservations that mobile station 102 will be authorized to make on target access points 108 and 110.

Acquiring authorization phase 301 may include acquire request message 306 sent by mobile station 102 directly or indirectly to authorization server 104. Acquire request message 306 may request authorization server 104 for authorization to reserve resources. Acquiring authorization phase 301 may also include acquire response message 308, acquire confirm message 310 and authorization successful message 312, which are described in more detail below.

Spending acquired authorization phase 303 may include the transmission of one or more resource reservation request messages 314 from mobile station 102 to one or more target access points 108, 110 to request a resource reservation. Spending acquired authorization phase 303 may also include authorization request message 316 sent from one or more target access points 108, 110 to authorization server 104, authorization response message 318 sent from authorization server 104 back to one or more target access points 108, 110, and reservation response message 320 sent from one or more target access points 108, 110 to mobile station 102. These are also described in more detail below.

In some embodiments, authorization server 104 may use a random number generator to generate a challenge value in response to acquire request message 306 received from mobile station 102. Authorization server 104 may send the challenge value as part of acquire response message 308 to mobile station 102. In these embodiments, acquire response message 308 may be secured with a message authentication code ($m_K$). In these embodiments, a message authentication code algorithm may be applied to a portion of acquire response message 308 which may be used to compute the message authentication code using an authentication key (K). This is discussed in more detail below.

In some embodiments, a source-authenticated and forgery-protected channel may have been previously established between one or more of access points 112 and authorization server 104. In some embodiments, a source-authenticated and forgery-protected channel may have been previously established between mobile station 102 and current access point 106 and between mobile station 102 and authorization server 104. In some embodiments, a session key may have been established for each source-authenticated and forgery-protected channel, although the scope of the invention is not limited in this respect. The communications illustrated in FIG. 3 may take place over these previously established source-authenticated and forgery-protected channels, although the scope of the invention is not limited in this respect.

In some embodiments, acquire request message 306 includes a station identifier 'SA' and a random number 'R' generated by mobile station 102. Acquire response message 308 may include the station identifier, the random number generated by mobile station 102, and the challenge value generated by authorization server 104. In some embodiments, a first portion of acquire response message 308 may comprise the station identifier, the random number and the challenge value, and a second portion of acquire response message 308 may comprise the message authentication code.

In some embodiments, the first portion of acquire response message 308 may comprise the station identifier concatenated with the random number, the challenge value, and the second portion. In these embodiments, the second portion may comprise the message authentication code. In these embodiments, the station identifier in acquire request message 306 may allow authorization server 104 to determine the session key to use to construct acquire response message 308. Including the random number in both acquire request message 306 and acquire response message 308 may allow mobile station 102 to verify that acquire response message 308 is a fresh message and was not generated prior to acquire request message 306. In these embodiments, the message authentication code may use an authentication key for detecting forged messages. Examples of suitable message authentication codes include codes in accordance with the advanced encryption standard (AES) in a cipher-based message authentication code algorithm (CMAC) mode and the secure hash algorithm 256 (SHA-256) in a Keyed-Hash Message Authentication Code (HMAC) mode, although the scope of the invention is not limited in this respect.

In some embodiments, acquire request message 306 may be represented as SA∥R, and acquire response message 308 may be represented as SA∥R∥C∥$m_K$(SA∥R∥C). In these expressions, 'SA' represents the station identifier, 'R' represents the random number generated by mobile station 102, 'C' represents the challenge value, '$m_K$' represents a message authentication code, and '∥' represents a concatenation.

In some embodiments, mobile station 102 generates hash chain 200 in response to receipt of acquire response message 308 by initially generating hash chain root 206 using a random number generator. In these embodiments, mobile station 102 may generate each subsequent reservation token 204 of hash chain 200 by performing a hash iteratively on a concatenation of a prior generated reservation token 204 and the challenge value. In these embodiments, hash chain root 206 (e.g., $H_n$) may be an initial one of reservation tokens and may be used to generate a next one of the reservation tokens (e.g., $H_{n-1}$). In some embodiments, the following expressions may be used to generate hash chain 200:

$$H_{n-1}=h(H_n\|C), H_{n-2}=h(H_{n-1}\|C), \ldots, H_0=h(H_1\|C).$$

In these expressions, h represents a hash function, $H_1$ through $H_{n-1}$ represent reservation tokens 204, $H_0$ represents commitment value 202, $H_n$ represents hash chain root 206, and n is the reservation limit. In some embodiments, a hash chain generator may be used to generate the values of hash chain 200 including commitment value 202 and hash chain root 206. In these embodiments, each reservation token 204 may authorize one resource reservation by mobile station 102. Examples of suitable hash functions include SHA-256, Whirlpool, and the AES in Davies-Meyer mode, although the scope of the invention is not limited in this respect.

In some embodiments, the last generated reservation token may comprise commitment value 202. Mobile station 102 may send commitment value 202 to authorization server 104 within acquire confirm message 310. In response, authorization server 104 may authorize mobile station 102 to reserve bandwidth on the number of target access points corresponding to the number of reservation tokens 204 of hash chain 200 when acquire confirm message 310 is verified.

In these embodiments, acquire confirm message 310 may be represented as $SA\|C\|H_0\|m_K(SA\|C\|H_0)$. In these embodiments, the station identifier may be used to identify the message authentication key, the challenge value included within the message authentication code ($m_K$) may help assure authorization server 104 that acquire confirm message 310 is a fresh message, and commitment value 202 included within the message authentication code may help protect commitment value 202 from forgery. When acquire confirm message 310 is verified, authorization server 104 may delete any prior state it has stored for mobile station 102 so that mobile station 102 will be inhibited from accumulating more than n resource reservations while associated with current access point 106. Authorization server 104 may also update its database to include the latest authorization (i.e., commitment value 202) for mobile station 102. Authorization server 104 may also notify current access point 106 over a source-authenticated and forgery-protected channel with authorization successful message 312 so that current access point 106 may update an authorization flag for mobile station 102. The authorization flag may indicate to current access point 106 not to forward any acquire request messages 306 or acquire confirm messages 310 from mobile station 102 to authorization server 104. In this way, number of resource reservations that mobile stations 102 may acquire while associated with current access point 106 may be limited to the reservation limit. In these embodiments, an authorization flag may be set when acquire confirm message 310 is verified, although the scope of the invention is not limited in this respect.

In some embodiments, commitment value 202 of hash chain 200 may be used by authorization server 104 to determine if a received reservation token 204 is a member of hash chain 200. In some embodiments, mobile station 102 generates hash chain 200 using fresh random numbers and sends commitment value 202 to authorization server 104 so that authorization server 104 may use commitment value 202 to authorize a reservation request by mobile station 102. In these embodiments, $H_0$ is referred to as a commitment value because it may be computationally infeasible for any party, including mobile station 102 and authorization server 104, to correctly compute commitment value 202 unless a next value in hash chain 200 (i.e., $H_1$) is known. In this way, mobile station 102 has "committed" itself to value $H_1$ when it registers $H_0$. Similarly, it may be computationally infeasible to correctly compute $H_1$ without knowing $H_2$, and so forth through $H_n$. Thus, when mobile station 102 provides commitment value 202 in acquire confirm message 310, commitment value 202 "commits" mobile station 102 to the set of reservation tokens 204 (i.e., $H_1, H_2, \ldots, H_{n-1}$) as well as to hash chain root 206 (i.e., $H_n$) of hash chain 200. These embodiments take advantage of one-way property of hash chain 200 to help assure that no device other than mobile station 102 is likely to reproduce hash chain 200, including authorization server 104. Although authorization server 104 may not be able to generate hash chain 200, authorization server 104 may verify that mobile station 102 has submitted the correct one of reservation tokens 204 from hash chain 200. This is discussed in more detail below.

In some embodiments, resource reservation request 314 is authorized by authorization server 104 by computing and verifying a hash on a received reservation token concatenated with the challenge value. In some embodiments, resource reservation request 314 may be denied when a hash of received reservation token 204 concatenated with challenge value is not equal to commitment value 202. In some embodiments, resource reservation request 314 may also be denied when a hash of received reservation token 204 concatenated with the challenge value is equal to a prior received reservation token. In some embodiments, resource reservation request 314 may be authorized or permitted when it is not denied and when a hash of received reservation token 204 concatenated with the challenge value is equal to commitment value 202. In other words, when received reservation token 204 is determined to be an unused member of hash chain 200 generated by mobile station 102, resource reservation request 314 may be authorized.

In some embodiments, resource reservation request 314 may be denied when $H_0 \neq h^i(H_j\|C)$ for $i=1, 2, \ldots n$, where $H_j$ is a received reservation token (i.e., one of reservation tokens 204). In this way, only reservation requests conveying a current hash chain value are approved. Resource reservation request 314 may also be denied when $H_j = h^i(H_k\|C)$ for $i=1, 2, \ldots n$, where $H_j$ is a previously received reservation token (i.e., one of reservation tokens 204). In these expressions, the superscript 'i' refers to the $i^{th}$ hash function iteration. In some embodiments, the hash may be iterated as represented by the following expressions:

$H_{j-1} = h(H_j\|C) = h^1(H_j\|C), \quad H_{j-2} = h(H_{j-1}\|C) = h^2(H_j\|C),$ which may be generally represented by the following expression:

$$H_{j-i} = h(H_{j-i+1}\|C) = h^i(H_j\|C).$$

In these embodiments, an attacker may be prevented from reusing a prior used reservation token that may have become public. When resource reservation request 314 is permitted, authorization server 104 may update its database for mobile station 102 with received reservation token 204. These embodiments of the present invention may limit total number resource reservations that a single mobile station may hold, although the scope of the invention is not limited in this respect. Furthermore, some embodiments of the present invention may allow wireless network 100 to control and manage its QoS resources despite the possible presence of rogue mobile stations and access points, although the scope of the invention is not limited in this respect.

In some embodiments, in response to resource reservation request 314 received from mobile station 102 through target access point 108, target access point 108 may send authorization request message 316 to authorization server 104 to request authorization for mobile station 102 to reserve resources. In these embodiments, authorization server 104 may either permit or deny the request and may provide authorization response message 318 to target access point 108. Target access point 108 may provide reservation response message 320 to mobile station 102 to indicate that mobile station 102 is either permitted to reserve resources or not permitted to reserve resources.

In some embodiments, authorization server 104 may be part of an authentication, accounting, and administration (AAA) server for wireless network 100. In these embodiments, authorization server 104 may be coupled to access points 112 wirelessly or over a wireline network. In some embodiments, the communications between authorization server 104 and access points 112 may take place over a network, such as in intranet or Internet, although the scope of the invention is not limited in this respect. In some embodiments, authorization server 104 may be functionally or logically part of one of access points 112, although the scope of the invention is not limited in this respect.

In some embodiments, during communications with current access point 106, mobile station 102 may reserve resources on a number of target access points 108 and 110 up to the reservation limit and may select one of target access points 108 and 110 for transferring communications thereto. The decision of when to transfer communications to a target access point may be determined by mobile station 102 based on parameters that may include signal strength, bit-error-rate, throughput, signal-to-noise ratio (SNR) and/or signal to interference and noise ratio (SINR), although the scope of the invention is not limited in this respect.

In some embodiments, when mobile station 102 determines it is time to acquire a new set of reservation tokens, mobile station 102 may acquire authorization to reserve resources by performing acquiring authorization phase 301. When reservation tokens of a prior authorization exist, these reservation tokens may be cancelled (e.g., obliterated, erased, or used) before authorization server 104 may authorize mobile station 102 to generate a new set of reservation tokens. In some embodiments, mobile station 102 may acquire authorization to generate a new set of reservation tokens 204 after transitioning to target access point 108. In other embodiments, mobile station 102 may continue to use existing set of reservation tokens 204 after transitioning to target access point 108. In some embodiments, after transitioning to target access point 108, mobile station 102 may acquire authorization to generate a new set of reservation tokens 204 allowing mobile station 102 to hold up to twice the reservation limit of reservation tokens 204, although the scope of the invention is not limited in this respect.

In some embodiments, after transitioning to target access point 108, target access point 108 may notify authorization server 104 of the transition, and target access point 108 may become the current associated access point. In these embodiments, the resource reservations held on other target access points may be cancelled by authorization server 104, although the scope of the invention is not limited in this respect.

Figure 4:
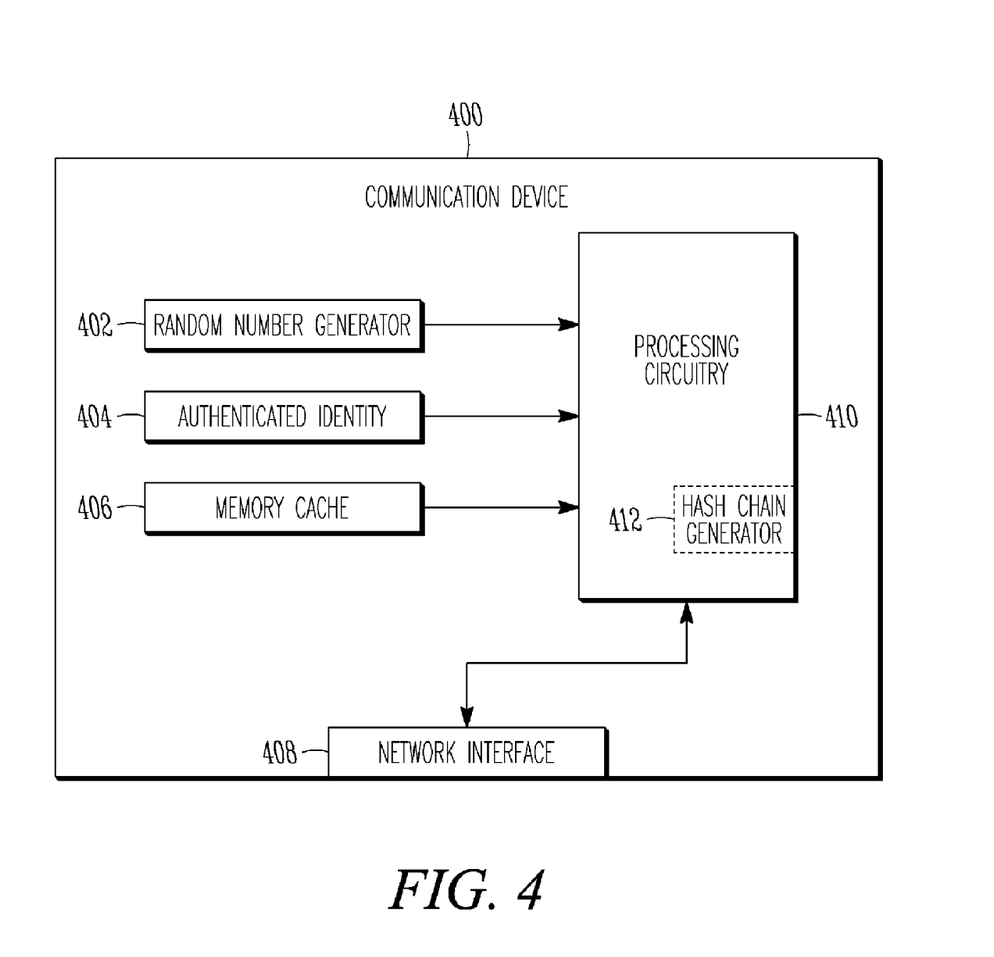
FIG. 4 is a block diagram of a wireless communication device in accordance with some embodiments of the present invention.

FIG. 4 is a block diagram of a wireless communication device in accordance with some embodiments of the present invention. Communication device 400 may be suitable for use as one of access points 112 (FIG. 1), mobile station 102 (FIG. 1), and/or authorization server 104 (FIG. 1). Communication device 400 may include random number generator 402, authenticated identity 404, memory 406, network interface circuitry 408, and processing circuitry 410. In some wireless embodiments, network interface circuitry 408 may be coupled with one or more antennas, such as antennas 101 (FIG. 1), for use in communicating with other network devices. In some wireline embodiments, network interface circuitry 408 may be coupled with wired and/or wireline communication elements (e.g., wires, cables, busses, etc.).

Referring to FIGS. 1 through 4, when communication device 400 represents a mobile station, such as mobile station 102, communication device 400 may further comprise hash chain generator 412, which may be used to generate hash chain 200 in response to acquire response message 308. When communication device 400 is a mobile station, such as mobile station 102, random number generator 402 may be used to generate the random number in acquire request message 306, and authenticated identity 404 may comprise the mobile station's station identifier, which may also be included in acquire request message 306, acquire confirm message 310, and resource reservation request 314. Memory cache 406 may maintain a current state of mobile station 102. The current state may include the reservation limit and a unique session key which may be shared with authorization server 104 and used to key the message authentication code discussed above. The current state may also include hash chain 200.

In the case of authorization server 104, memory cache 406 may maintain a current state of authorization server 104. The current state may include a reservation limit for each mobile station associated with an access point in wireless network 100, and a logical database of pairs comprising the station identifiers and the corresponding session keys. In some embodiments, the database may be indexed by the station identifiers allowing the session key to be determined when the station identifier is known. The session keys may be used, for example, by authorization server 104 to detect messages that may be forged by devices masquerading as mobile station 102. The current state may also include a logical database that includes the station identifiers and corresponding challenge values, commitment values and last-used reservation tokens. As discussed above, the challenge value and the commitment value may be used to determine whether a received reservation token is a member of the mobile station's current hash chain, and the last-used reservation token may be used to verify that a currently received reservation token is a fresh token. In the case of authorization server 104 (FIG. 1), authenticated identity 404 may comprise the authorization server's identity.

In the case of authorization server 104, network interface circuitry 408 may receive resource authorization request message 316 from target access point 108, and processing circuitry 410 may verify reservation token 204 received from mobile station 102 within resource reservation request 314. Processing circuitry 410 may authorize target access point 108 to reserve bandwidth thereon when the reservation token 204 is verified. Random number generator 402 may be used to generate a challenge value and processing circuitry 410 may be used to verify reservation tokens 204 by computing and verifying a hash on a received reservation token concatenated with the challenge value.

In the case of access points 112, memory cache 406 may maintain a current state an access point. The current state may include an indicator, such as an 'is authorized' Boolean, to indicate whether each associated mobile station is authorized to reserve resources on target access points. The indicator may indicate that a currently associated mobile station has generated and registered a hash chain as discussed above. Memory cache 406 may also include session keys and the reservation limit. In the case of access points 112, authenticated identity 404 may comprise the access point's identity.

Although communication device 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of communication device 400 may refer to one or more processes operating on one or more processing elements.

In some embodiments, communication device 400 may communicate orthogonal frequency division multiplexed (OFDM) communication signals over a multicarrier communication channel. The multicarrier communication channel may be within a predetermined frequency spectrum and may comprise a plurality of orthogonal subcarriers. In some embodiments, the multicarrier signals may be defined by closely spaced OFDM subcarriers. In some embodiments, communication device 400 may communicate in accordance with a multiple access technique, such as orthogonal frequency division multiple access (OFDMA), although the scope of the invention is not limited in this respect. In some embodiments, communication device 400 may communicate using spread-spectrum signals, although the scope of the invention is not limited in this respect.

In some embodiments, wireless network 100 may be a wireless local area network (WLAN), such as a Wireless Fidelity (WiFi) network. In some other embodiments, wireless network 100 may be a broadband wireless access (BWA) network, such as a Worldwide Interoperability for Microwave Access (WiMax) network, although the scope of the invention is not limited in this respect. In some embodiments, authorization server 104 may be part of one of access points 112, although the scope of the invention is not limited in this respect.

In some embodiments, mobile station 102 may a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that may receive and/or transmit information wirelessly.

In some embodiments, the frequency spectrums for the communication signals communicated by the devices of wireless network 100 may comprise either a 5 gigahertz (GHz) frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some BWA network embodiments, the frequency spectrum for the communication signals may comprise frequencies between 2 and 11 GHz, although the invention is not limited in this respect.

In some embodiments, the devices of wireless network 100 may communicate in accordance with specific communication standards, such as the Institute of Electrical and Electronics Engineers (IEEE) standards including IEEE 802.11 (a), 802.11(b), 802.11(g), 802.11(h), and/or 802.11(n) standards and/or proposed specifications for wireless local area networks, although the scope of the invention is not limited in this respect. In some embodiments, the devices of wireless network 100 may communicate in accordance with the IEEE 802.11 Task Group 'r' (TGr) proposed specifications for fast roaming in wireless local area networks. In some broadband wireless access network embodiments, the devices of wireless network 100 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11"Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. Some embodiments relate to the IEEE 802.11e proposed enhancement to the IEEE 802.11 WLAN specification that will include QoS features, including the prioritization of data, voice, and video transmissions.

When communication device 400 is a wireless communication device, network interface circuitry 408 may couple with one or more antennas, such as antennas 101, to receive and/or transmit wireless communication signals. In these embodiments, antennas 101 may comprise one or more directional or omnidirectional antennas, including, for example, dipole antennas, monopole antennas, patch antennas, loop antennas, microstrip antennas, or other types of antennas suitable for transmission of RF signals. In some multiple-input, multiple-output (MIMO) embodiments, two or more antennas may be used. In some embodiments, instead of two or more antennas, a single antenna with multiple apertures may be used. In these embodiments, each aperture may be considered a separate antenna. In some multi-antenna embodiments, each antenna may be effectively separated to take advantage of spatial diversity and the different channel characteristics that may result between each of the antennas and another wireless communication device. In some multi-antenna embodiments, the antennas may be separated by up to $\frac{1}{10}$ of a wavelength or more.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments may be implemented in one or a combination of hardware, firmware and software. Embodiments may also be implemented as instructions stored on a computer-readable medium, which may be read and executed by at least one processor to perform the operations described herein. A computer-readable medium may include any mechanism for storing or transmitting information in a form readable by a machine (e.g., a computer). For example, a computer-readable medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. An authorization server comprising:
   network interface circuitry to receive a resource reservation request from a target access point of a plurality of target access points;
   processing circuitry to verify a reservation token received from a mobile station and to authorize the target access point to reserve bandwidth thereon when the reservation token is verified, the reservation token being received within the resource reservation request and being provided to the authorization server by the target access point; and
   a random number generator to generate a challenge value for use by the mobile station in generating a hash chain comprising a predetermined number of reservation tokens,
   wherein the processing circuitry is configured to verify the reservation tokens by computing and verifying a hash on a received reservation token concatenated with the challenge value,
   wherein the authorization server is configured to establish a source-authenticated and forgery-protected channel with the access points, and
   wherein the authentication server uses the predetermined number of reservation tokens to limit a maximum number of target access points on which the mobile station can reserve bandwidth.

2. The authorization server of claim 1 wherein the authorization server denies the resource reservation request when a hash of the received reservation token concatenated with the challenge value is not equal to a commitment value,
   wherein the authorization server also denies the resource reservation request when a hash of the received reservation token concatenated with the challenge value is equal to a prior received reservation token, and
   wherein the authorization server permits the resource reservation request when it is not denied and when a hash of the received reservation token concatenated with the challenge value is equal to the commitment value.

3. The authorization server of claim 1 wherein in response to the resource reservation request received from the mobile station, the target access point is to send an authorization request message to the authorization server to request authorization for the mobile station to reserve bandwidth,
   wherein the authorization server is to either permit or deny the request and provide an authorization response message to the target access point, and
   wherein the target access point provides a reservation response message to the mobile station to indicate that the mobile station is either permitted to reserve bandwidth or not permitted to reserve bandwidth.

4. The authorization server of claim 1 wherein the hash chain is generated from a hash chain root corresponding to an initial one of the reservation tokens, and
   wherein each subsequent reservation token of the hash chain is generated by performing a hash iteratively on a concatenation of a prior generated reservation token and the challenge value.

5. An authorization server comprising:
   network interface circuitry to receive a resource reservation request from a target access point;
   processing circuitry to verify a reservation token received from a mobile station and to authorize the target access point to reserve bandwidth thereon when the reservation token is verified, the reservation token being received within the resource reservation request and being provided to the authorization server by the target access point; and
   a random number generator to generate a challenge value for use by the mobile station in generating a hash chain comprising a predetermined number of reservation tokens,
   wherein the processing circuitry is configured to verify the reservation tokens by computing and verifying a hash on a received reservation token concatenated with the challenge value,
   wherein the authorization server is configured to establish a source-authenticated and forgery-protected channel with the access points,
   wherein the mobile station generates the hash chain in response to receipt of an acquire response message by:
   initially generating a hash chain root using a random number generator of the mobile station; and
   generating each subsequent reservation token of the hash chain by performing a hash iteratively on a concatenation of a prior generated reservation token and the challenge value, and
   wherein the hash chain root is an initial one of the reservation tokens and is used to generate a next one of the reservation tokens.

6. The authorization server of claim 5 wherein a last-generated of the reservation tokens comprises a commitment value,
   wherein the mobile station sends the commitment value to the authorization server within an acquire confirm message, and
   wherein the authorization server authorizes the mobile station to reserve bandwidth on a number of target access points corresponding to the predetermined number of reservation tokens of the hash chain when the acquire confirm message is verified.

7. A wireless network comprising:
   a plurality of access points to receive resource reservation requests from a mobile station; and
   an authorization server to authorize the access points to reserve bandwidth thereon for roaming by verifying reservation tokens received from the mobile station in the resource reservation requests,
   wherein a source-authenticated and forgery-protected channel is established between the access points and the authorization server, and
   wherein the mobile station generates a hash chain from a challenge value provided by the authorization server, the hash chain comprising a predetermined number of reservation tokens, each reservation token to reserve bandwidth on one access point, and
   wherein the authentication server uses the predetermined number of reservation tokens to limit a maximum number of the access points on which the mobile station can reserve bandwidth.

8. The wireless network of claim 7 wherein the authorization server comprises a random number generator to generate the challenge value in response to an acquire request message received from the mobile station, and
   wherein the authorization server sends the challenge value as part of an acquire response message to the mobile station, the acquire response message being secured with a message authentication code.

9. The wireless network of claim 8 wherein the acquire request message includes a station identifier and a random number generated by the mobile station, and wherein the acquire response message includes the station identifier, the random number generated by the mobile station, the challenge value generated by the authorization server, and the message authentication code.

10. The wireless network of claim 7 wherein the resource reservation request is denied when a hash of a received reservation token concatenated with the challenge value is not equal to a commitment value, wherein the resource reservation request is also denied when a hash of the received reservation token concatenated with the challenge value is equal to a prior received reservation token, and wherein the resource reservation request is permitted when it is not denied and when a hash of the received reservation token concatenated with the challenge value is equal to the commitment value.

11. The wireless network of claim 10 wherein in response to the resource reservation request received from the mobile station through a target access point, the target access point is to send an authorization request message to the authorization server to request authorization for the mobile station to reserve bandwidth, wherein the authorization server either permits or denies the request and provides an authorization response message to the target access point, and wherein the target access point provides a reservation response message to the mobile station to indicate that the mobile station is either permitted to reserve bandwidth or not permitted to reserve bandwidth.

12. The wireless network of claim 7 wherein the hash chain is generated from a hash chain root corresponding to an initial one of the reservation tokens, and wherein each subsequent reservation token of the hash chain is generated by performing a hash iteratively on a concatenation of a prior generated reservation token and the challenge value.

13. A wireless network comprising:

a plurality of access points to receive resource reservation requests from a mobile station; and an authorization server to authorize the access points to reserve bandwidth thereon for roaming by verifying reservation tokens received from the mobile station in the resource reservation requests, wherein a source-authenticated and forgery-protected channel is established between the access points and the authorization server, and wherein the mobile station generates a hash chain from a challenge value provided by the authorization server, the hash chain comprising a predetermined number of reservation tokens, each reservation token to reserve bandwidth on one access point, wherein the mobile station generates the hash chain in response to receipt of an acquire response message by:

initially generating a hash chain root using a random number generator of the mobile station; and generating each subsequent reservation token of the hash chain by performing a hash iteratively on a concatenation of a prior generated reservation token and the challenge value, and wherein the hash chain root is an initial one of the reservation tokens and is used to generate a next one of the reservation tokens.

14. The wireless network of claim 13 wherein a last-generated of the reservation tokens comprises a commitment value, wherein the mobile station sends the commitment value to the authorization server within an acquire confirm message, and wherein the authorization server authorizes the mobile station to reserve bandwidth on a number of target access points corresponding to the predetermined number of reservation tokens of the hash chain when the acquire confirm message is verified.

15. The wireless network of claim 13 wherein a resource reservation request is authorized by the authorization server by computing and verifying a hash on a received reservation token concatenated with the challenge value.

16. A method for securely reserving bandwidth on access points for fast roaming in a wireless network comprising:

authorizing the access points to reserve bandwidth thereon by verifying reservation tokens received from a mobile station through the access points in resource reservation requests;

providing a challenge value for use by the mobile station in generating a hash chain from the challenge value, the hash chain comprising a predetermined number of the reservation tokens; and verifying the reservation tokens by computing and verifying a hash on a received reservation token concatenated with the challenge value, wherein as part of the authorizing, an authentication server uses the predetermined number of reservation tokens to limit a maximum number of access points on which the mobile station can reserve bandwidth.

17. The method of claim 16 wherein a source-authenticated and forgery-protected channel is established between the access points and the authorization server and wherein the method further comprises:

using a random number generator to generate the challenge value in response to an acquire request message received from the mobile station; and sending the challenge value as part of an acquire response message to the mobile station, the acquire response message being secured with a message authentication code.

18. The method of claim 17 wherein the acquire request message includes a station identifier and a random number generated by the mobile station, and wherein the acquire response message includes the station identifier, the random number generated by the mobile station, the challenge value generated by the authorization server and the message authentication code.

19. The method of claim 16 further comprising:

denying the resource reservation request when a hash of a received reservation token concatenated with the challenge value is not equal to a commitment value;

denying the resource reservation request when a hash of the received reservation token concatenated with the challenge value is equal to a prior received reservation token; and permitting the resource reservation request when it is not denied and when a hash of the received reservation token concatenated with the challenge value is equal to the commitment value.

20. The method of claim 16 wherein the hash chain is generated from a hash chain root corresponding to an initial one of the reservation tokens, and wherein each subsequent reservation token of the hash chain is generated by performing a hash iteratively on a concatenation of a prior generated reservation token and the challenge value.

21. A method for securely reserving bandwidth on access points for fast roaming in a wireless network comprising:

authorizing the access points to reserve bandwidth thereon by verifying reservation tokens received from a mobile station through the access points in resource reservation requests;

providing a challenge value for use by the mobile station in generating a hash chain from the challenge value, the hash chain comprising a predetermined number of the reservation tokens; and verifying the reservation tokens by computing and verifying a hash on a received reservation token concatenated with the challenge value, wherein the mobile station generates the hash chain in response to receipt of an acquire response message by:

initially generating a hash chain root using a random number generator of the mobile station; and generating each subsequent reservation token of the hash chain by performing a hash iteratively on a concatenation of a prior generated reservation token and the challenge value, wherein the hash chain root is an initial one of the reservation tokens and is used to generate a next one of the reservation tokens.

22. The method of claim 21 wherein a last generated reservation token comprises a commitment value, wherein the mobile station sends the commitment value to the authorization server within an acquire confirm message, and wherein the method further comprises authorizing the mobile station to reserve bandwidth on a number of target access points corresponding to the predetermined number of reservation tokens of the hash chain when the acquire confirm message is verified.

23. A method for securely reserving bandwidth on access points for fast roaming in a wireless network comprising:

authorizing the access points to reserve bandwidth thereon by verifying reservation tokens received from a mobile station through the access points in resource reservation requests;

providing a challenge value for use by the mobile station in generating a hash chain from the challenge value, the hash chain comprising a predetermined number of the reservation verifying the reservation tokens by computing and verifying a hash on a received reservation token concatenated with the challenge value;

denying the resource reservation request when a hash of a received reservation token concatenated with the challenge value is not equal to a commitment value;

denying the resource reservation request when a hash of the received reservation token concatenated with the challenge value is equal to a prior received reservation token;

permitting the resource reservation request when it is not denied and when a hash of the received reservation token concatenated with the challenge value is equal to the commitment value;

receiving from a target access point an authorization request message to request authorization for the mobile station to reserve bandwidth; and permitting or denying the request and providing an authorization response message to the target access point, wherein the target access point to provide a reservation response message to the mobile station to indicate that the mobile station is either permitted to reserve bandwidth or not permitted to reserve bandwidth.

* * * * *

UNITED STATES PATENT AND TRADEMARK OFFICE
CERTIFICATE OF CORRECTION

| | |
|---|---|
| PATENT NO. | : 7,702,333 B2 |
| APPLICATION NO. | : 11/382814 |
| DATED | : April 20, 2010 |
| INVENTOR(S) | : Jesse R. Walker et al. |

Page 1 of 1

It is certified that error appears in the above-identified patent and that said Letters Patent is hereby corrected as shown below:

In column 16, line 12, in Claim 23, after "reservation" insert -- tokens; --.

Signed and Sealed this

Fifteenth Day of June, 2010

David J. Kappos
*Director of the United States Patent and Trademark Office*